(12) United States Patent
Sharifi et al.

(10) Patent No.: US 12,374,331 B2
(45) Date of Patent: *Jul. 29, 2025

(54) TRANSIENT PERSONALIZATION MODE FOR GUEST USERS OF AN AUTOMATED ASSISTANT

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,610

(22) Filed: Sep. 18, 2023

(65) Prior Publication Data

US 2024/0005924 A1 Jan. 4, 2024

Related U.S. Application Data

(63) Continuation of application No. 16/947,753, filed on Aug. 14, 2020, now Pat. No. 11,798,546.

(51) Int. Cl.
  *G10L 15/22* (2006.01)
  *G10L 13/027* (2013.01)
  *H04L 9/32* (2006.01)

(52) U.S. Cl.
  CPC .......... *G10L 15/22* (2013.01); *G10L 13/027* (2013.01); *H04L 9/3231* (2013.01)

(58) Field of Classification Search
  CPC ....... G10L 15/22; G10L 13/027; G10L 13/00; G10L 2015/227; H04L 9/3231; G06F 21/606; G06F 21/32
  See application file for complete search history.

(56) References Cited

U.S. PATENT DOCUMENTS 10,693,872 B1  6/2020  Larson et al.
11,038,934 B1  6/2021  Hansen et al.
(Continued)

FOREIGN PATENT DOCUMENTS

CN  110800044    2/2020
WO  2018213415   11/2018
WO  2019236745   12/2019

OTHER PUBLICATIONS

European Patent Office; Communication issued in Application No. 23179364.7; 5 pages; dated Nov. 8, 2023.
Intellectual Property India; Response to First Examination Report issued for Application No. 202227069690, 269 pages, dated Apr. 26, 2023.
(Continued)

*Primary Examiner* — Mark Villena
(74) *Attorney, Agent, or Firm* — Gray Ice Higdon

(57) ABSTRACT

Implementations set forth herein relate to an automated assistant that can operate in a transient personalization mode, and/or assist a separate automated assistant with providing output according to a transient personalization mode. The transient personalization mode can allow a guest user of an assistant enabled-device to receive personalized responses from the assistant-enabled device—despite not being signed into the assistant-enabled device. A host automated assistant of the assistant-enabled device can securely communicate with a guest user's automated assistant through a backend process. In this way, input queries from the guest user to the host automated assistant can be personalized according to the guest automated assistant—without the guest user directly engaging with their own personal device.

19 Claims, 8 Drawing Sheets

(56) References Cited

U.S. PATENT DOCUMENTS

| | | |
|---|---|---|
| 11,069,363 B2 | 7/2021 | Reed et al. |
| 2007/0014407 A1 | 1/2007 | Narendra et al. |
| 2015/0264574 A1 | 9/2015 | Dong et al. |
| 2015/0281394 A1 | 10/2015 | Raja et al. |
| 2016/0314792 A1 | 10/2016 | Alvarez Guevara et al. |
| 2018/0012604 A1 | 1/2018 | Guevara et al. |
| 2018/0096302 A1 | 4/2018 | Tseretopoulos |
| 2019/0182261 A1 | 6/2019 | Carbune et al. |
| 2019/0371315 A1 | 12/2019 | Newendorp et al. |
| 2020/0026839 A1* | 1/2020 | Yi .................... G06F 21/32 |
| 2020/0045041 A1 | 2/2020 | Heidari |
| 2020/0127988 A1 | 4/2020 | Bradley et al. |
| 2020/0134147 A1 | 4/2020 | Van Den Hoven |
| 2020/0194004 A1 | 6/2020 | Bates |
| 2020/0265842 A1* | 8/2020 | Singh .................... G10L 17/00 |
| 2021/0090578 A1 | 3/2021 | Trapp et al. |
| 2022/0051663 A1 | 2/2022 | Sharifi |

OTHER PUBLICATIONS

European Patent Office; Intention to Grant issued in Application No. 20839475.9; 50 pages; dated Jan. 13, 2023.
European Patent Office; International Search Report and Written Opinion of Ser. No. PCT/US2020/064944; 11 pages; dated Apr. 23, 2021.
European Patent Office; Intention to Grant issued in Application No. 23179364.7; 50 pages; dated Apr. 30, 2024.
Canadian Intellectual Property Office; Office Action issued in Application No. 3,182,638; 4 pages; dated May 8, 2024.
China National Intellectual Property Administration; Notification of First Office Action issued in Application No. 202080102329.2; 27 pages; dated Oct. 12, 2024.
Intellectual Property India; Hearing Notice issued for Application No. 202227069690, 3 pages, dated Dec. 11, 2024.
China National Intellectual Property Administration; Notice of Grant issued in Application No. 1 202080102329.2; 6 pages; dated Apr. 23, 2025.

* cited by examiner

TRANSIENT PERSONALIZATION MODE FOR GUEST USERS OF AN AUTOMATED ASSISTANT

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, an automated assistant can be available to a user via each of multiple disparate automated assistant devices (i.e., computing devices that each provide access to the automated assistant) that are each in a signed-in mode for the user. In a signed-in mode, credentials of the user can be utilized by a computing device to enable an automated assistant, that is accessible via the computing device, to at least selectively access (e.g., responsive to speaker verification and/or facial verification of the user) various data that is specific to the user. Furthermore, the automated assistant can utilize such data in processing user requests submitted to the automated assistant via the computing device. For example, such data can be utilized in performing speech recognition of a spoken utterance from the user (e.g., utilized in selecting a speech recognition language, in biasing toward certain term(s), etc.), in determining underlying content for a response to the spoken utterance (e.g., determining the content from such data, or using such data to identify the content), and/or in determining which speech synthesis voice in which to audibly render the response (e.g., a voice that is easily understandable by the user). Accordingly, utilizing an automated assistant in a signed-in mode provides various technical benefits, such as ensuring accurate speech processing of requests of a user, generating responses that are relevant to the requests, and/or rendering of responses in a manner that is readily understood by the user.

However, multiple user-device interactions may often be required for a given computing device to at least selectively be in a signed-in mode for a user. These interactions can include multiple touch inputs to an automated assistant application to add the user as an authorized user for the computing device. Moreover, for computing devices for which the user is not an administrator, the user may need to interact with the administrator to cause the administrator to add the user as an authorized user. Further, data security concerns can arise when a user operates in signed-in mode for a given computing device that is only being transiently utilized by the user.

In view of these and other considerations, multiple benefits of operating in a signed-in mode are present for personal computing device(s) of a user and/or for computing device(s) with which the user persistently interacts (e.g., those in a home of the user). However, for a computing device with which a user only transiently interacts (e.g., only a limited quantity of interactions and/or for a limited duration of time), the user may be unable to be in a signed-in mode (e.g., the given user may lack authorization to be added as a signed-in user). Additionally or alternatively, the multiple inputs required to add the user as a signed-in user may not be warranted for a transient interaction, and—furthermore, providing the multiple inputs would require delay of the transient interaction. As one example, when a user is utilizing a computing device at a home of a friend, or at a business (e.g., a hotel), the user may only be able to operate with an automated assistant of the computing device in a guest mode. Functionality of the automated assistant can be limited in the guest mode and/or various benefits of a signed-in mode may be unavailable in the guest mode.

SUMMARY

Implementations set forth herein relate to various techniques for transiently adapting processing of automated assistant request(s), based on data that is personal to a user—particularly when the request(s) are provided by the user at an automated assistant device at which the user is not a signed-in/authenticated user. Such transient adaptation is sometimes referenced herein as operating according to a transient personalization mode. Operating in a transient personalization mode allows for a guest user request, that is received at a host automated assistant device, to be processed using data that is personal to the user despite that user not being authenticated with the host automated assistant device. This can include, for example, using the data in performing speech recognition if the request is a spoken utterance, using the data in determining underlying content for a response to the request, and/or in determining which speech synthesis voice in which to audibly render the response. Some implementations enable transient personalization despite, in some instances, the guest user having no prior interactions with the host automated assistant device.

As used herein, a "host automated assistant" will be used to reference an instance of an automated assistant that is accessible to a host automated assistant device for which a guest user, who is utilizing the host automated assistant device, is not a signed-in user for the automated assistant. As used herein, a "guest automated assistant" will be used to reference an instance of an automated assistant that is accessible to a guest automated assistant device for which the guest user is a signed-in user. In other words, the guest user is not an authenticated user for the host device and, as a result, the host automated assistant device cannot be used to directly access automated assistant data that is personal to the user. On the other hand, the guest user is an authenticated user for the guest automated assistant device and, as a result, the guest automated assistant device can provide direct access to automated assistant data that is personal to the guest user and/or is stored in association with an account of the guest user.

In some implementations, for a host automated assistant to operate in a transient personalization mode for a guest user, the host automated assistant may determine that the guest user is associated with a guest automated assistant. For example, various users can have assistant accounts that are associated with their own respective automated assistants (i.e., a guest user can have their own personal automated assistant). However, when a particular user is considered a guest user with respect to a host automated assistant (e.g., an automated assistant that is accessible via a host device), this host automated assistant can determine that the user has an established account with a guest automated assistant (e.g., an automated assistant that is accessible via a personal computing device of the user).

In some implementations, before operating in a transient personalization mode, a host automated assistant can ensure that there is a correlation between a guest user and a particular input. For example, a correlation determination for a guest user can be initialized in response to a host automated assistant device receiving an input from the guest user who may be traveling for work. The input can be a spoken utterance such as, "Assistant, what is on my calendar?", which can be provided by the guest user to a host automated assistant device in, for example, a hotel room. In response to receiving the spoken utterance, the host automated assistant can initially determine whether the source of the spoken utterance corresponds to an existing authenticated user (e.g., an owner of the hotel). For example, the host automated assistant device, or another network device, can determine whether a biometric signature (e.g., voice, face, fingerprint, pupil, etc.) of the person who provided the spoken utterance matches a biometric signature of any existing authenticated user(s) (e.g., staff at the hotel). Based on the host automated assistant determining that the spoken utterance was provided by a non-authenticated user (e.g., does not match any signed-in users of the device), the host automated assistant can identify a nearby device that is associated with a user who provided the spoken utterance, or other input, to the host automated assistant.

For example, in some implementations, the host automated assistant can confirm that the spoken utterance corresponds to a user who is within a vicinity of the host automated assistant device. The host automated assistant can generate: a voice embedding and/or a voice vector that is based on a vocal signature embodied in the spoken utterance, a face embedding and/or a face vector that is based on one or more images, a fingerprint embedding and/or a fingerprint vector that is based on a scan of a finger of a user, and/or any other information that can be used for biometric authentication with prior permission from the user. The voice embedding can be used to encrypt an authentication value (e.g., a secret string of characters or other data), and the encrypted value can be shared with one or more nearby devices. For instance, one or more devices, including a guest device, can receive the encrypted authentication value via a Bluetooth, ultrasonic, local area network (LAN), wide area network (WAN), internet, intranet, and/or Wi-Fi connection. In some implementations, devices qualified to receive the encrypted authentication value can be limited to certain devices that are within a threshold distance from the host device. In response, the guest device can attempt to decrypt the encrypted authentication value using the same, or a similar, voice embedding that is accessible to the guest device. Because the host device and the guest device have each received spoken utterances from the guest user, their respective embeddings can have similar arrangements in latent space. Therefore, a guest device that has a voice embedding that corresponds to the guest user who provided the spoken utterance will be able to decrypt the encrypted authentication value. In this way, the host device can ensure that the spoken utterance corresponds to a nearby user and a nearby device, thereby reserving the transient personalization mode for those users who are truly proximate to the host device.

In some implementations, when the guest device decrypts the encrypted authentication value, the guest device can communicate the authentication value back to the host device in order to indicate to the host device that the guest device is authenticated with the guest user. In response to receiving the correct authentication value, the host device can communicate the spoken utterance to the guest device. For example, the host device can generate encrypted query data that embodies the spoken utterance and can communicate the encrypted query data to the guest device. The communicated query data can include audio data, textual data (e.g., text from speech-to-text processing performed at the host device), and/or natural language processing data (e.g., identifiers for action intents and/or parameters of said action intents). The guest device can then generate responsive data based on the encrypted query data, and share the responsive data with the host device. Alternatively, or additionally, the host device can provide the encrypted query data with the encrypted authentication value, in order that only a guest device with the correct voice embedding will be able to decrypt the assistant queries and the authentication value. Responsive data, as well as the authentication value, can then be provided back to the host device, which can render an output based on the responsive data.

In accordance with the aforementioned example, the guest device can decrypt the encrypted query data to determine that the guest user is requesting that the host automated assistant tell the guest user what is on a calendar of the guest user. Based on this determination, the guest device (e.g., a cell phone of the guest user) can cause the guest automated assistant, or a separate application, to access a calendar application of the guest user in order to generate responsive data for the host automated assistant to render. When the guest device and/or an associated device generate the responsive data, which can correspond to a description of scheduled events (e.g., "Today at 6:00 PM you have 'Dinner with Dad.'"), the guest device can communicate the responsive data to the host device. Alternatively, or additionally, the guest device can communicate one or more user preferences of the guest user, such as a preferred voice profile for the automated assistant. The host device can optionally receive the responsive data as encrypted responsive data. The host device can then process the responsive data in order to render a corresponding output at one or more interfaces of the host device. For example, and as a result of this process, the host device can provide the guest user with an audible response such as, "According to your calendar, today at 6:00 PM you have 'Dinner with Dad.'" In this way, the guest user does not have to exclusively rely on their personal device in order to receive personalized responses from an automated assistant. This can allow guest users to preserve computational resources, such as battery life and network usage, of their personal devices while they are away from their homes.

The host automated assistant can determine that the spoken utterance is suitable for a personalized response based on determining, for example, that the spoken utterance includes content that may only be accessible to those who have access to a calendar application managed by the guest user. Alternatively, or additionally, the automated assistant can determine that the spoken utterance is suitable for a personalized response based on determining that the subject matter of the spoken utterance (e.g., calendar) relates to user-customizable information, and/or the spoken utterance includes a possessive pronoun (e.g., "my"). Alternatively, or additionally, one or more trained machine learning models can be used to determine whether the spoken utterance includes a query that is suitable for a personalized response. Alternatively, or additionally, the host automated assistant can omit determining whether the spoken utterance is suitable for a personalized response and, rather, determine whether the guest user is associated with a guest automated assistant. As used herein, a guest automated assistant can be another automated assistant that is (i) provided by the same entity that provides a host automated assistant, (ii) an additional automated assistant that is provided by a different entity, and/or (iii) associated with a particular automated assistant that is accessible via an application programming interface (API) that is available to the host automated assistant.

When the host automated assistant determines that the spoken utterance includes a query that is suitable for a personalized response, and/or when the host automated assistant determines that the user is associated with a separate automated assistant, the host automated assistant may initialize operating in the transient personalization mode. However, the host automated assistant may initially confirm whether the spoken utterance is correlated to a nearby user and/or a nearby assistant-enabled device, in order to before transitioning into the transient personalization mode. In some implementations, when a host device receives a spoken utterance that includes a personal query, but the host device cannot authenticate with any nearby device, the host automated assistant can provide a response that is not personalized. Alternatively, or additionally, the host automated assistant can provide a response that explicitly states that the response from the host automated assistant is not personalized for the guest user who provided the personal query and/or that the host automated assistant could not identify an account and/or a device that is associated with the guest user. This can put certain guest users on notice that, although they may be aware that they can receive personalized results from a host automated assistant, the response they are currently receiving is not personalized for them. In these circumstances, such notices can eliminate miscommunications with any host automated assistants that can operate in a transient personalization mode.

In some implementations, a user can provide permission for a host automated assistant and a guest automated assistant to coordinate personalized responses prior to the host automated assistant processing queries from the user. Alternatively, or additionally, the user can limit permissions for the host automated assistant based on time, context, subject matter, and/or any other parameter that is suitable for limiting responsiveness of an automated assistant. For example, when the guest user initially provides a personal query to the host automated assistant, the host automated assistant can request that the guest automated assistant handle the personal query. In response to receiving the request from the host automated assistant, the guest automated assistant can render a prompt to the guest user in order to get permission for the guest automated assistant to coordinate personalized responses with the host automated assistant. Alternatively, or additionally, the guest automated assistant or another application can prompt the guest user regarding whether the guest user would like to limit the transient personalization mode of the host automated assistant. In response, the guest user can select to limit the transient personalization mode of the host automated assistant to a particular time period (e.g., for the next 24 hours), a particular place (e.g., when the guest user is within a threshold proximity of the host automated assistant device), and/or a particular context (e.g., when a calendar of the guest user indicates that the guest user is on a business trip).

In some implementations, when the guest user has given the host automated assistant permission to provide personalized responses, the host automated assistant can also operate to provide personalized suggestions to the guest user. For example, when the guest user is staying in a hotel room that includes a host automated assistant device, and the user has given permission to receive personalized responses, the host automated assistant can render certain content based on personal preferences of the user. For instance, when the guest user provides a spoken utterance, or regardless of whether the guest user provides an automated assistant query, the guest device can share user preferences with the host automated assistant when the guest user has already granted permission for such sharing. Using this user preference data, the host automated assistant can select and/or organize certain search results in order to render personalized content for a user. For example, the user preferences can characterize a language preference of a user, a food preference of a user, musical preferences, event preferences, and/or any other preference that can be characterized in data. In this way, when a host automated assistant at a host device in, for example, a hotel room is rendering restaurant suggestions for a guest user, the host automated assistant will be able to filter suggested content according to user preferences identified by a guest automated assistant. Alternatively, or additionally, when the host device is processing a spoken utterance from a guest user, the host device can perform the processing using an automatic speech recognition (ASR) model that is employed by the guest automated assistant. Alternatively, or additionally, when the host device is rendering an audible output in response to a spoken utterance from a guest user, the host device can render the audible output according to a preferred text-to-speech (TTS) profile selected by the guest automated assistant.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
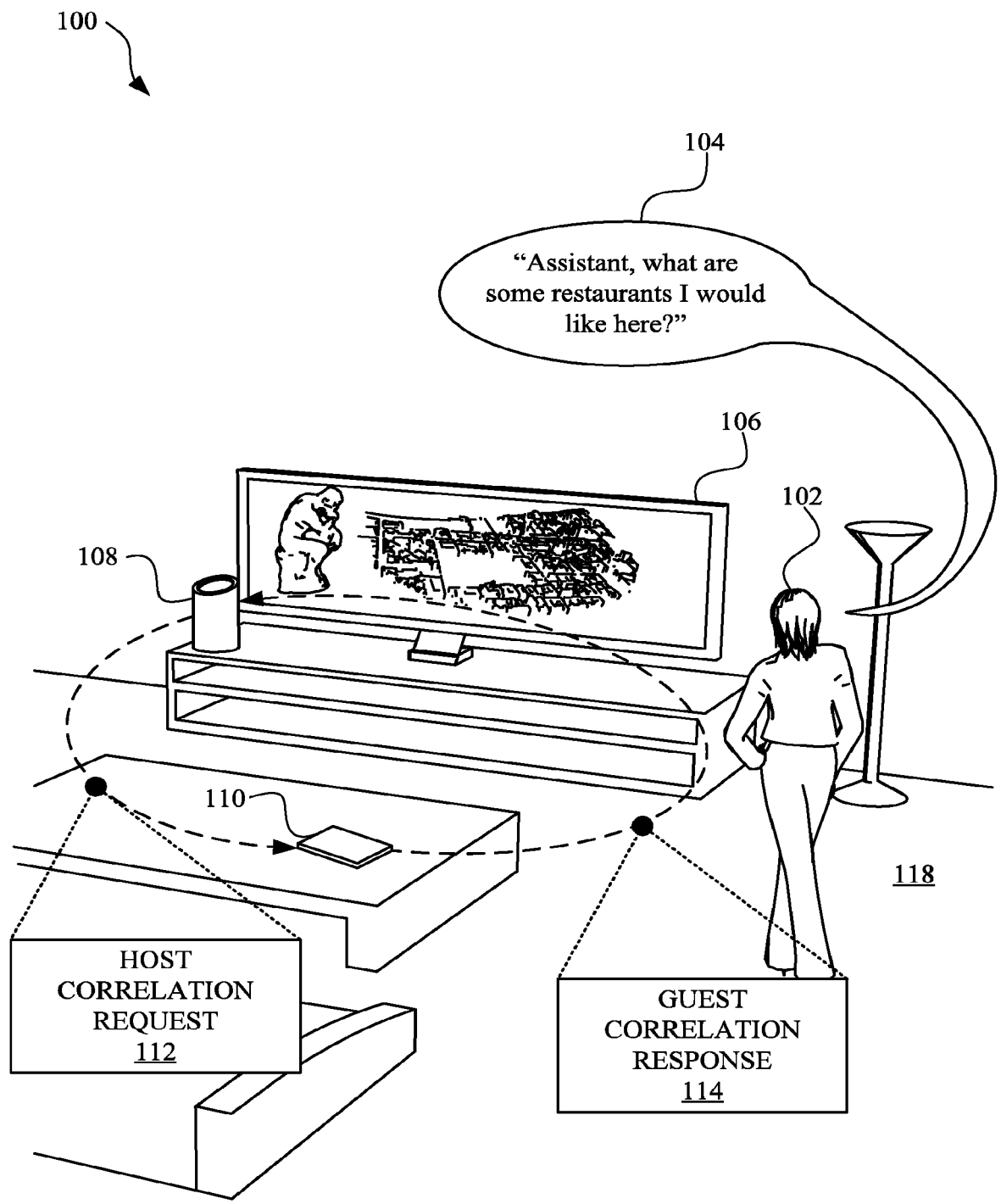
FIG. 1A and FIG. 1B illustrate views, respectively, of a user interacting with a host automated assistant, which can invoke a guest automated assistant when operating in a transient personalization mode for a guest user.
Figure 1B:
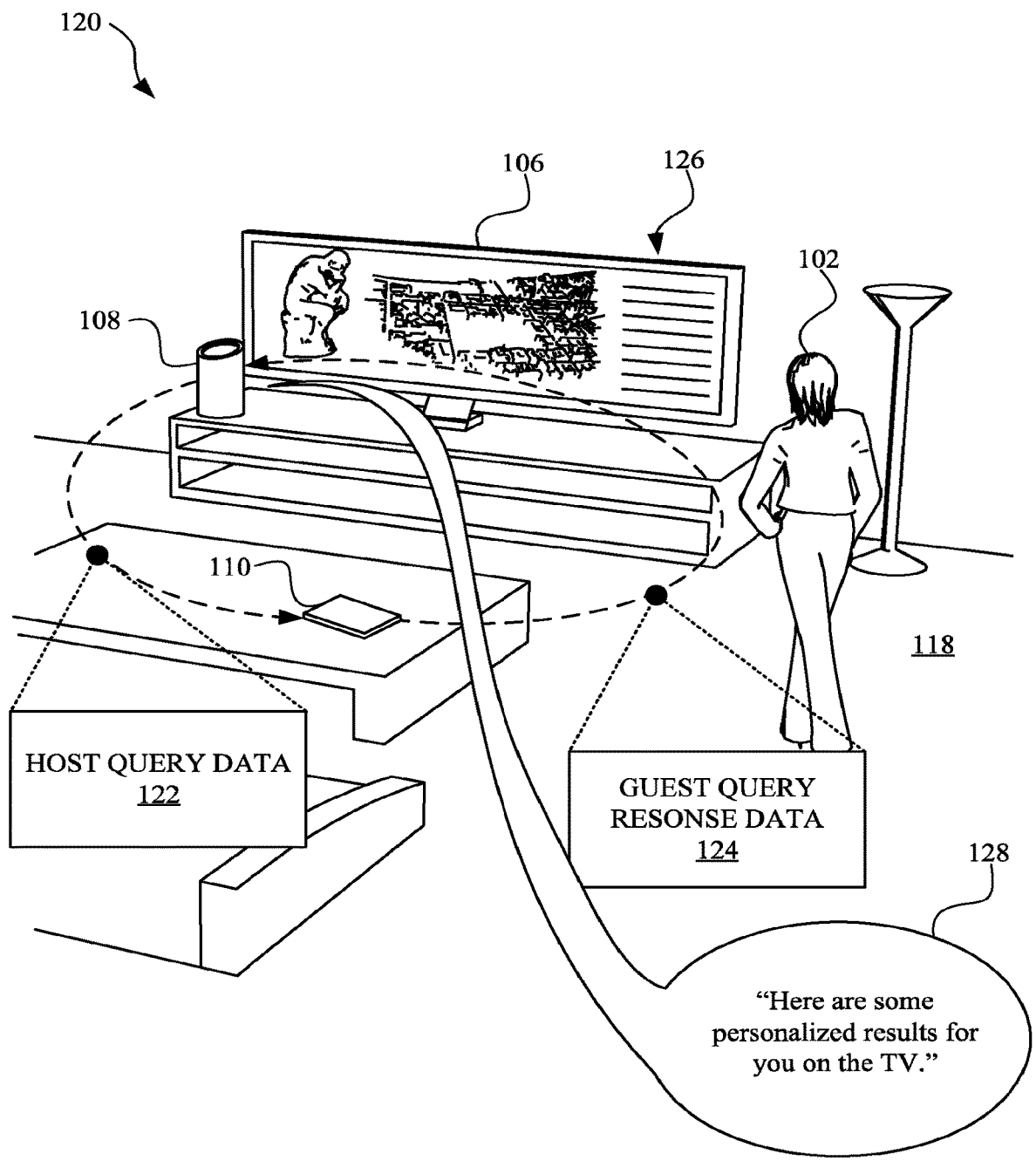

FIG. 1A and FIG. 1B illustrate a view 100 and a view 120, respectively, of a user 102 interacting with a host automated assistant, which can invoke a guest automated assistant when operating in a transient personalization mode for guest users. For example, the user 102 can be traveling outside of their respective country and staying in a particular hotel room 118. The user 102 can arrive in the hotel room 118 with their personal device 110, which can be a portable computing device such as a cellular phone. Furthermore, the hotel room 118 can include one or more assistant enabled devices, such as a host device 108 and a host television 106.

Initially, when the user 102 arrives in the hotel room 118, the host device 108 and the host television 106 can operate according to an account corresponding to an entity that is separate from the user 102, such as a hotel business. Therefore, initially, the host device 108 and the host television 106 would not have access to a different account corresponding to the user 102, and therefore may not initially be able to provide the user 102 with personalized responses. For example, the personal device 110 owned by user 102 can provide access to a guest automated assistant that can provide personalized responses to the user 102 based on prior interactions with the user 102 and/or other data. However, although the host device 108 and the host television 106 may provide access to a host automated assistant, the host automated assistant may not be able to provide personalized information to the user 102 without interacting with the guest automated assistant.

In order to interact with the guest automated assistant, the host automated assistant can operate in a transient personalized mode. This mode can allow the host automated assistant to provide personalized responses to guest users that are associated with another automated assistant. For example, the user 102 can provide a spoken utterance 104 to the host device 108 such as, "Assistant, what are some restaurants I would like here?" In response to receiving the spoken utterance 104, a host automated assistant that is accessible via the host device 108 can optionally determine whether the spoken utterance 104 includes one or more assistant queries that can have personalized responses. For example, the host automated assistant can determine whether the spoken utterance embodies at least one assistant query that can be personalized using data that may not be currently accessible to the host automated assistant. Alternatively, or additionally, the host automated assistant can omit determining whether the spoken utterance 104 embodies a query that can have a personalized response and, instead, determine whether a source of the spoken utterance 104 is associated with another automated assistant.

For example, in some implementations, the host device 108 can provide a host correlation request 112 to the personal device 110 of user 102 before or after receiving the spoken utterance 104. The host correlation request 112 can be a request for the personal device 110 or the guest automated assistant to provide information to the host automated assistant that indicates the guest automated assistant is correlated with the user 102 who provided the spoken utterance 104 and/or that a guest automated assistant-enabled device is with an operational vicinity of the guest automated system. In some implementations, the host device 108 or an associated device can generate embedding data or other authentic data, and use this data to encrypt secret data that will be accessible to the personal device 110, but not any other devices that do not have certain permissions from the guest user. The embedding data can be, for example, a voice embedding or voice vector that is based on at least some amount of audio captured when the user 102 provided the spoken utterance 104. In this way, because the guest automated assistant would have previously received spoken utterances from the user 102, the guest automated assistant would be able to use the same embedding or a similar embedding to decrypt the secret data. For instance, when the personal device 110 receives the host correlation request 112, the personal device 110 or another associated personal device, can decrypt the host correlation request 112 in order to identify the secret data. The personal device 110 can then generate a guest correlation response 114 that identifies, or is otherwise based on, the secret data. An indication that the secret data has been successfully decrypted by the personal device 110 can be embodied in the guest correlation response 114 and provided back to the host device 108 via a network connection (e.g., Wi-Fi, Bluetooth, ultrasonic connection, ZigBee, etc.), as illustrated in FIG. 1A.

When the host device 108 determines that a nearby personal device 110 is correlated with the user 102, the host device 108 can provide host query data 122 to the personal device 110. Alternatively, or additionally, the host query data 122 can be provided to the personal device 110 with the host correlation request 112. In some implementations, the host device 108 can provide raw audio data of the spoken utterance provided by the user 102. Alternatively, or additionally, the house device 108 can provide encrypted audio data that can be decrypted by the personal device 110. Alternatively, or additionally, the host device 108 can provide natural language understanding (NLU) data that characterizes one or more actions being requested by the user 102. Alternatively, or additionally, the host device 108 can provide a textual transcript of one or more portions of the spoken utterance 104 to the personal device 110.

In response to receiving the host query data 122, the personal device 110 and/or the guest automated assistant can generate guest query response data 124. The guest query response data 124 can characterize one or more automated assistant outputs that are responsive to one or more queries embodied in the spoken utterance 104 from the user 102. In some implementations, the guest query response data 124 can be encrypted in a way that allows the host device 108 an ability to decrypt the automated assistant outputs. In some implementations, the guest query response data 124 can include natural language content characterizing an output 128 to be rendered by the host automated assistant. For example, when the host device 108 receives the guest query response data 124 from the personal device 110, the host device 108 can use the guest query response data 124 to render an audible output 128. For instance, the host automated assistant of the host device 108 can render natural language content such as, "Here are some personalized results for you on the TV."

Alternatively, or additionally, the guest query response data 124 can characterize data that is responsive to the spoken utterance 104, but is not embodied in a natural language sentence format. For example, the guest query response data 124 can include a list 126, which the host device 108 can cause to be rendered at the host television 106. In this way, the user 102 can seamlessly interact with host devices in order to receive personalized responses, without requiring that the user be exclusively engaged in an extended authentication process.

In some implementations, the personal device 110 can prompt the user 102 regarding whether the user 102 would like the host device 108 to no longer use the personal device 110 for the transient personalization mode. Alternatively, or additionally, the personal device 110 and/or the host device 108 can prompt the user regarding whether the user 102 would like to limit the transient personalization mode to a certain time period, a certain location, and/or any other identifiable limitation. In this way, the user 102 can allow the host device 108 to operate in the transient personalization mode strictly for the duration of their vacation, without having to constantly affirm approval of the host device 108 operating in the transient personalization mode. This can preserve computational resources that might otherwise be consumed during interactions in which the user 102 repeats certain permissions to the host automated assistant.

Figure 2A:
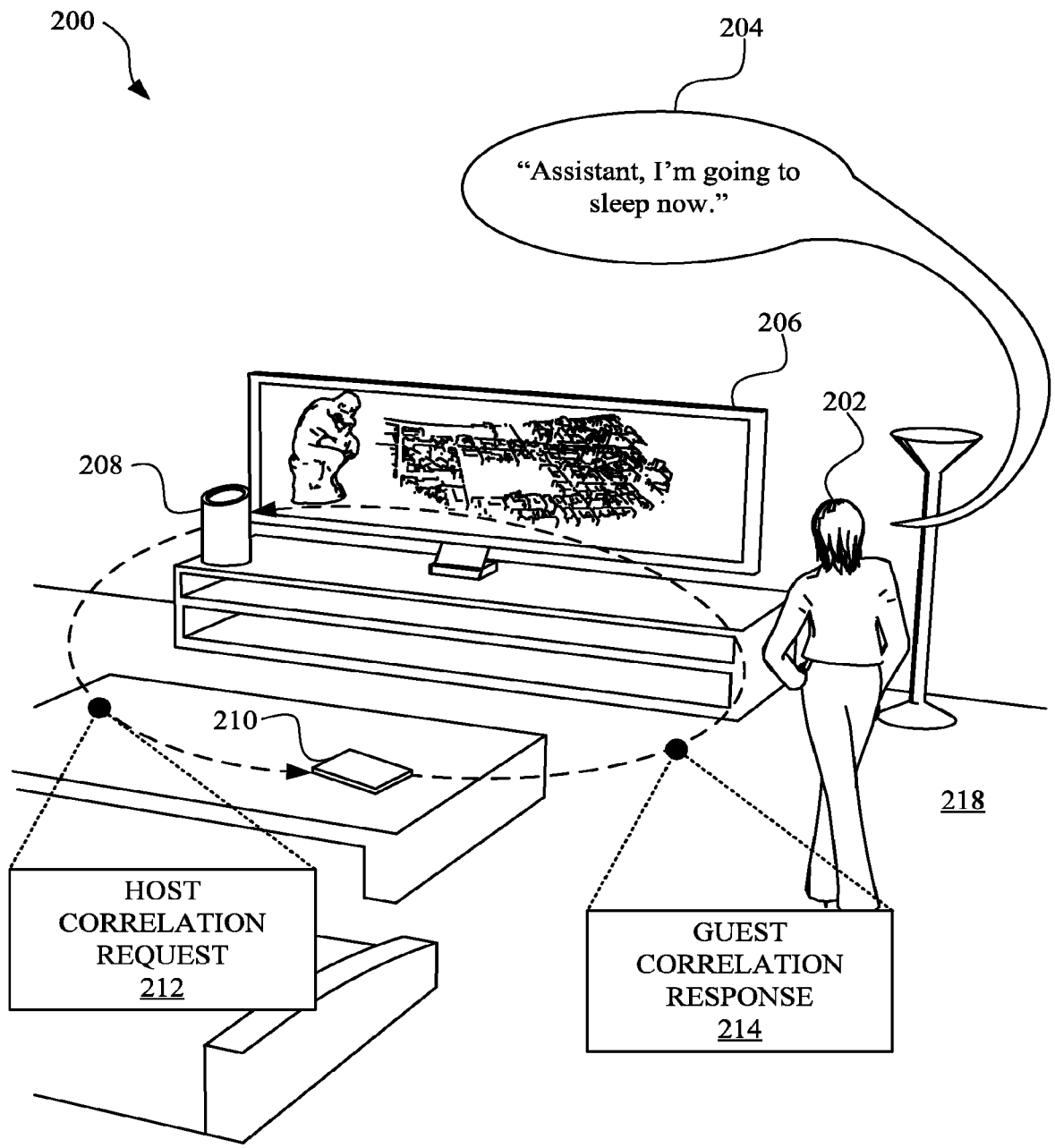
FIG. 2A and FIG. 2B illustrate views of a user interacting with a host automated assistant, which can employ guest user preferences when operating in a transient personalization mode for guest users.
Figure 2B:
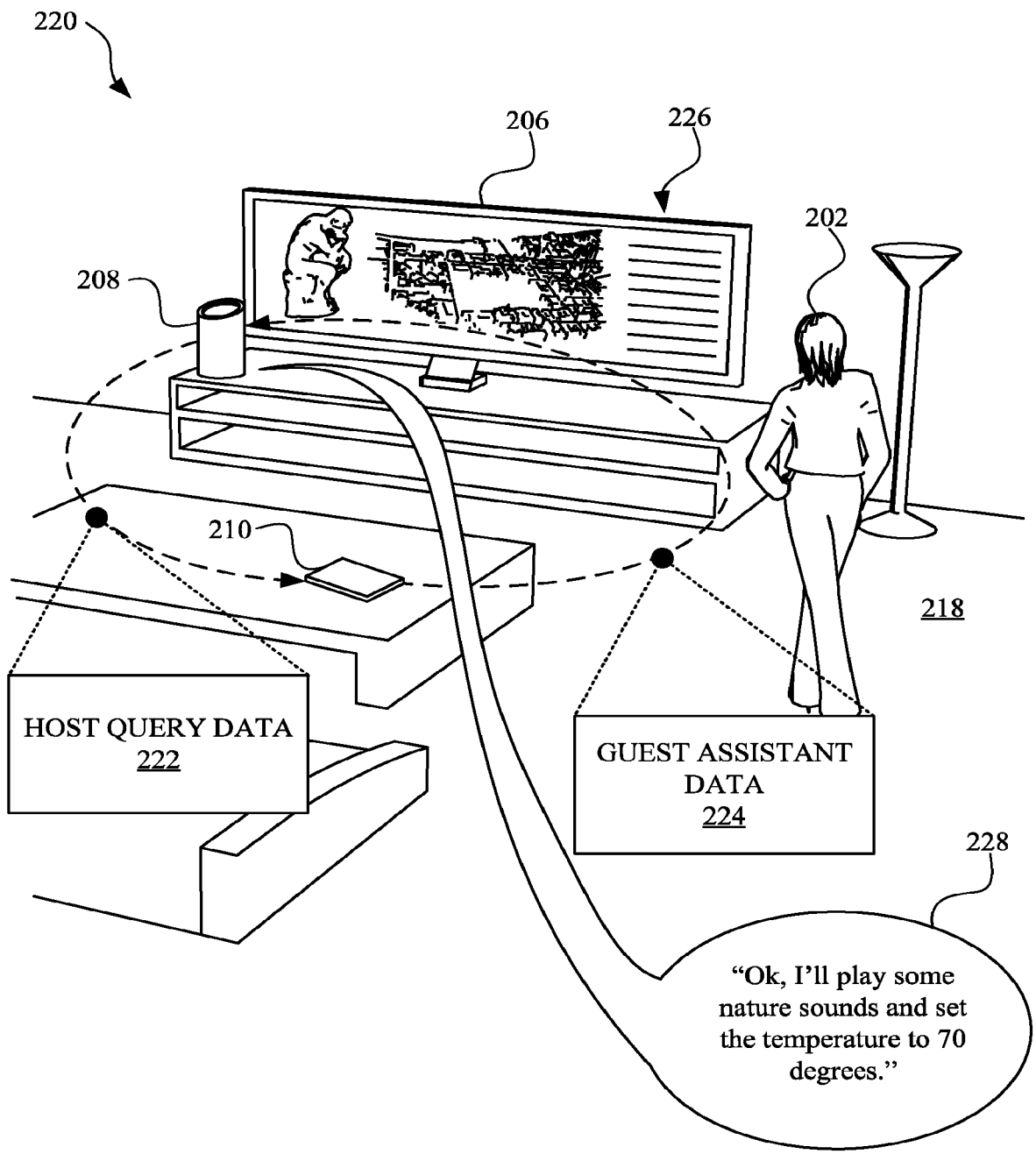

FIG. 2A and FIG. 2B illustrate a view 200 and a view 220 of a user 202 interacting with a host automated assistant, which can employ guest user preferences when operating in a transient personalization mode for guest users. In some implementations, the interaction illustrated in FIG. 2A and FIG. 2B can be a continuation of the interaction between the user 102 and the host device 108 illustrated in FIG. 1A and FIG. 1B. Furthermore, functionality described with respect to FIG. 1A and FIG. 1B can apply to the features illustrated in FIG. 2A and FIG. 2B.

In some implementations, a user 202 can be traveling outside of their home and staying in a guest room 218 that includes one or more host devices that provide access to a host automated assistant. For example, the one or more host devices can include a host device 208 and a host television 206. While the user 202 is outside of their home, they may bring their personal device 210, which can be a cellular phone or other device that provides access to a guest automated assistant, or—said another way, an automated assistant that has prior permission to access an account of the user of 202.

In some implementations, because the user 202 is traveling and the host device 208 may not be personalized for the user 202, the host device 208 may request user preference data from one or more devices and/or applications associated with the user 202. Such a request can be provided in response to the user 202 providing a spoken utterance 204 such as, "Assistant, I'm going to sleep right now." In response to receiving the spoken utterance 204, a host automated assistant that is accessible via the host device 208 can determine that the spoken utterance 204 embodies a request for an automated assistant to perform one or more actions and/or a routine. Alternatively, or additionally, the host automated assistant can determine that the spoken utterance 204 embodies one or more queries that are suitable for personalized responses.

In response to receiving the spoken utterance 204, the host device 208 and/or the host automated assistant can provide a host correlation request 212, which can be based on one or more of the implementations discussed with respect to the host correlation request 112. Furthermore, the personal device 210 can provide a guest correlation response 214 according to one or more implementations discussed with respect to the guest correlation response 114 of FIG. 1A and FIG. 1B. Based on successfully receiving the guest correlation response 214, the host device 208 and/or the host automated assistant can provide host query data 222 to the personal device 210. The host query data 222 can include a request for the personal device 210 and/or the guest automated assistant to provide data that may be useful for generating a response to the spoken utterance 204.

For example, the requested data can include user preference data, ASR data, TTS data, one or more trained machine learning models, and/or any other information that can be useful for generating a response to the spoken utterance 204. For example, the personal device 210 and/or the guest automated assistant can provide guest assistant data 224 to the host device 208. The guest assistant data 224 can indicate one or more user preferences associated with one or more queries embodied in the spoken utterance 204. For example, because the spoken utterance 204 refers to one or more assistant actions that will help the user 202 (e.g., a routine of one or more assistant actions that the guest automated assistant performs at night in response to the user 202 saying "I'm going to sleep."), the user preferences identified in the guest assistant data 224 can include one or more preferred parameters for user by the host automated assistant when executing the one or more assistant actions.

For instance, the one or more assistant actions can include setting a thermostat and playing some particular music or other audio. Therefore, in this instance, the guest assistant data 224 can identify a particular temperature setting for the thermostat and a particular radio station to play. In response to receiving in the spoken utterance 204, and based on the guest assistant data 224, the host automated assistant can provide an output 228 such as, "Okay, I'll play some nature sounds and set the temperature to 70 degrees." Furthermore, based on the guest assistant data 224, the host automated assistant can cause a thermostat in the room 218 to change the temperature setting to 70 degrees and can also render additional audio from a nature sounds radio station. In this way, computational resources can be preserved when a user can bypass directly inputting certain preferences to each assistant device that the user would like to temporarily personalize. Bypassing such operations can reduce an amount of audio processing or other input processing that would otherwise be performed in order for a host automated assistant to capture all preferences of a guest user.

Figure 3:
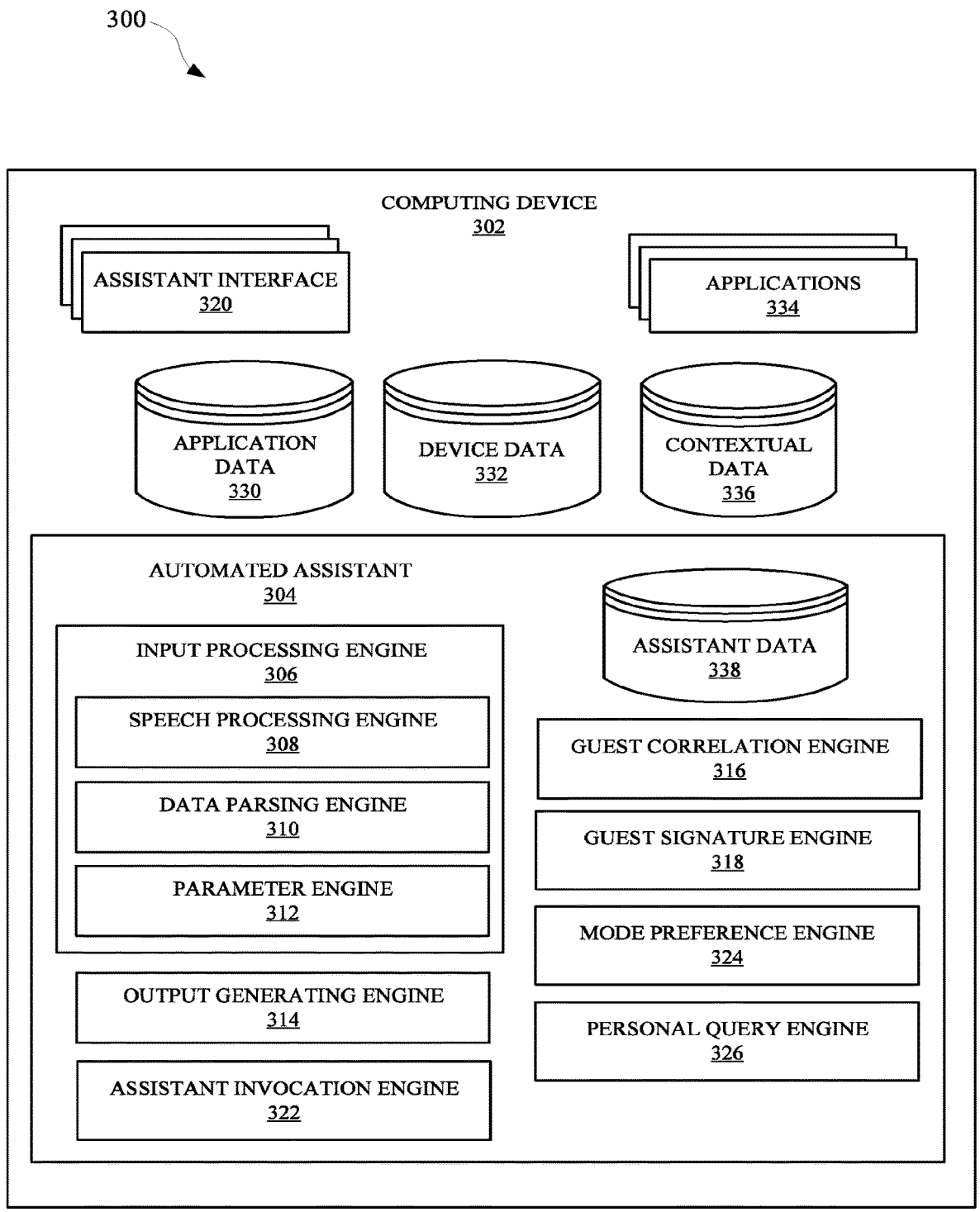
FIG. 3 illustrates a system for providing an automated assistant that can operate in a transient personalization mode and/or communicate with another automated assistant that is operating in a transient personalization mode.

FIG. 3 illustrates a system 300 for providing an automated assistant 304 that can operate in a transient personalization mode and/or assist another automated assistant that is operating in a transient personalization mode. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be intending to interact with the automated assistant 304.

The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302 (e.g., at a client computing device or a server computing device). Such implementations can be based on whether a response from the automated assistant 304 corresponds to data that is not stored at the client computing device and/or the response corresponds to an operation that should be performed by a separate computing device. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least be selectively utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant.

When the one or more trained machine learning models are trained according to these instances of training data, the assistant invocation engine 322 can cause the automated assistant 304 to detect, or limit detecting, spoken invocation phrases from a user based on features of a context and/or an environment, and/or a non-verbal activity of the user. Additionally, or alternatively, the assistant invocation engine 322 can cause the automated assistant 304 to detect, or limit detecting for one or more assistant commands from a user based on features of a context and/or an environment. In some implementations, the assistant invocation engine 322 can be disabled or limited based on the computing device 302 detecting an assistant suppressing output from another computing device. In this way, when the computing device 302 is detecting an assistant suppressing output, the automated assistant 304 will not be invoked based on contextual data 336—which would otherwise cause the automated assistant 304 to be invoked if the assistant suppressing output was not being detected.

In some implementations, the system 300 can include a guest correlation engine 316. The guest correlation engine 316 can be used to employ one or more operations for determining whether a user that provides an input to the automated assistant 304 is a guest user or a host user. Alternatively, or additionally, the guest correlation engine 316 can determine whether a guest user is within a threshold vicinity of the computing device 302, or an associated computing device, when the guest user indirectly or directly provides an input to the automated assistant 304. For example, the guest correlation engine 316 can determine that a voice signature or facial embedding associated with a user who has provided an input does not correspond to a user who is signed into the automated assistant 304 or otherwise has certain access permission(s) with the automated assistant 304. The guest correlation engine 316 can then include that the user is a guest user. When the guest correlation engine 316 determines that a guest user is directly or indirectly engaging with the automated assistant 304, the guest correlation engine 316 can invoke a guest signature engine 318 in order to identify another assistant device that is correlated to the guest user who is interacting with the automated assistant 304.

The guest signature engine 318 can use an authentic signature and/or embedding associated with the guest user in order to identify one or more other devices that may be correlated with the guest user. For example, the guest signature engine 318 can use a voice embedding to encrypt a communication that can be sent to one or more other devices. A device that can decrypt the communication, and indicate to the automated assistant 304 that the device successfully decrypted the communication, can be considered correlated with the guest user. For instance, a guest device can decrypt the communication using the same, or a similar, voice embedding that is generated from one or more prior interactions between the guest device and the guest user. Alternatively, or additionally, the guest signature engine 318 can identify a secret that only certain devices may have access to (e.g., such as a pin code rendered at a user interface for pairing purposes), and the secret can be used to correlate a particular guest device to a guest user. When the automated assistant 304 determines that the guest device is correlated with the guest user who provided the input, the automated assistant 304 can further communicate with the guest device in order to cause a guest automated assistant, associated with the guest user, to assist with processing the input received from the guest user. The guest device can then provide response data in response to the request from the host automated assistant 304.

In some implementations, the automated assistant 304 can include a mode preference engine 324, which can determine one or more preferences of a guest user, or an acquaintance of the guest user, who is interacting with a host automated assistant. For example, the automated assistant 304 can receive a request, or provide a request, to identify one or more preferences that a user may have when interacting with their own respective automated assistant. Such preferences can include preferences that are explicitly identified by the user or adapted for the user over time. For example, an automated assistant can provide preference data that identifies one or more trained machine learning models that can be used when processing an input from, or an output to, a user. For instance, a trained machine learning model can include an ASR model, speech-to-text model, text-to-speech model, and/or any other type of trained machine learning model that can be used during one or more operations of an automated assistant. This can allow the host automated assistant to provide responses that may be more readily interpreted by a guest user because the responses may be, for example, accented a certain way that the host automated assistant would not typically accent for a host user.

In some implementations, the automated assistant 304 can include a personal query engine 326, which can determine whether an input from a user is associated with information that can be personalized for a particular user. For example, the personal query engine 326 can use one or more trained machine learning models to determine whether an input and/or other interaction with the automated assistant 304 is associated with information that can be personalized for a particular user. In some implementations, the personal query engine 326 can be optional, and can optionally cause the automated assistant 304 to transition into a transient personalization mode when a guest user provides an input that is determined to be associated with personalized information. Alternatively, or additionally, when the personal query engine 326 determines that an input or interaction is not associated with personal information (e.g., the input is a request that can be satisfied using public data that is not associated with a particular user account), the personal query engine 326 can omit causing the automated assistant 304 to transition into the transient personalization mode.

Figure 4:
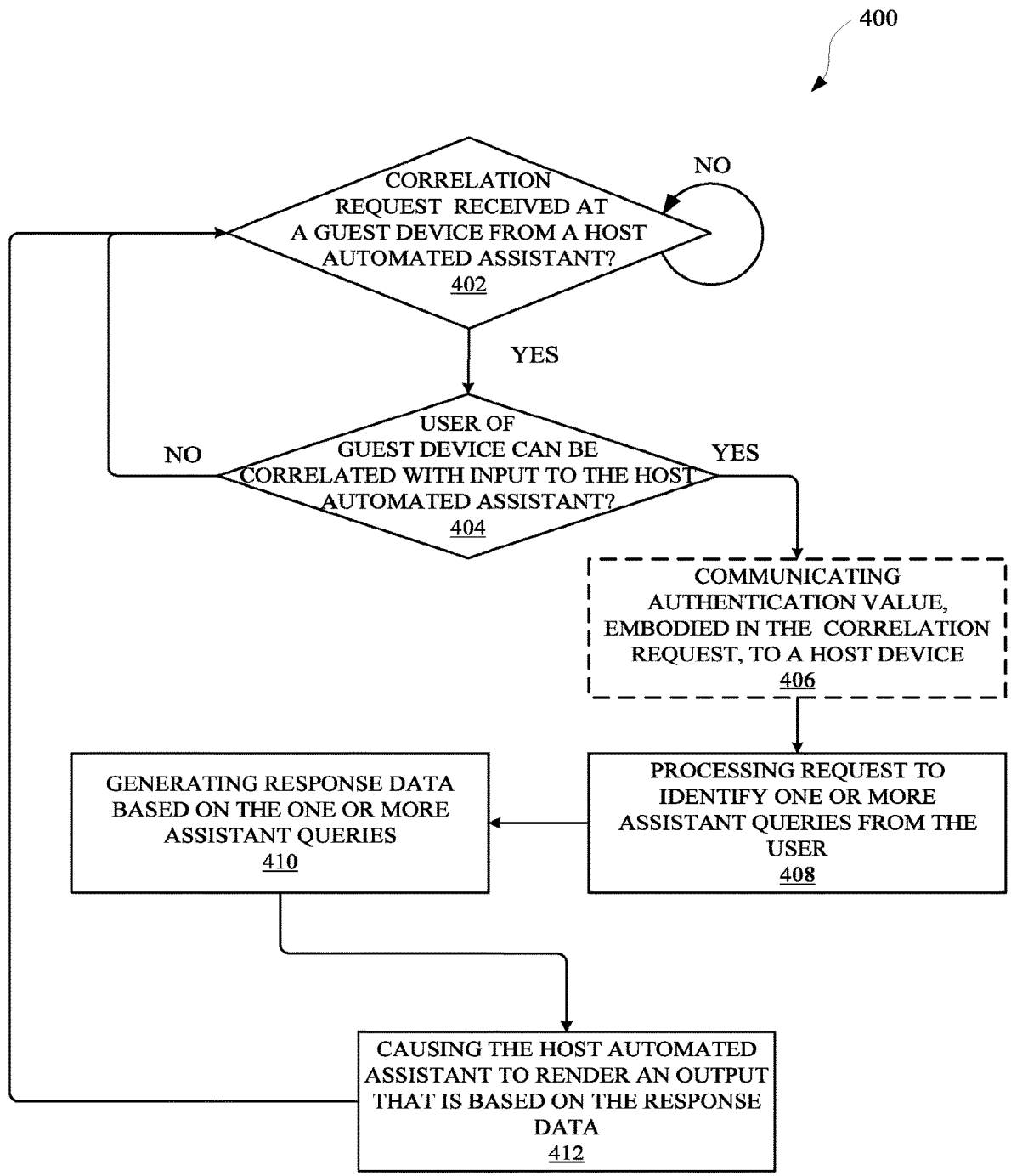
FIG. 4 illustrates a method for processing requests from a host automated assistant when the host automated assistant is attempting to operate in a transient personalization mode.

FIG. 4 illustrates a method 400 for processing requests from a host automated assistant when the host automated assistant is attempting to operate in a transient personalization mode. The method 400 can be performed by one or more applications, devices, and/or any other apparatus or module capable of performing operations associated with an automated assistant. The method 400 can include an operation 402 of determining whether a correlation request has been received from a host automated assistant. This determination can be made at a guest device that provides access to a guest automated assistant, which can be associated with a user who is in a vicinity of another assistant enabled device.

When a correlation request is received from a host automated assistant, the method 400 can proceed from the operation 402 to the operation 404, which can include determining whether the guest user can be correlated with the input to the host automated assistant. In some implementations, the guest device can receive encrypted data from the host device and the encrypted data can be encrypted using a value that is generated based on a unique input from the user. For example, the value can be a speech vector or a speech embedding that is based on a voice characteristic(s) of the user when the user provided a spoken input to the host automated assistant. In this way, because the guest automated assistant has received previous spoken utterances from the guest user, the guest automated assistant would be able to decrypt the encrypted data communicated from the host automated assistant.

When the host automated assistant determines that the guest device or guest automated assistant is associated with the user who provided an input to the host automated assistant, the method 400 can proceed to an operation 406. Otherwise, the method 400 can return to the operation 402. The operation 406 can be an optional operation that includes communicating an authentication value to the host automated assistant. The authentication value can be, for example, a secret that is generated by the host automated assistant, with the expectation that only a guest device that the user is signed into will be able to decrypt the encrypted data and identify the authentication value. Alternatively, or additionally, query data characterizing one or more requests embodied in the input from the user can be received by the guest automated assistant and acted upon without communicating the authentication value back to the host device.

The method 400 can proceed from the operation 404 or the operation 406 to an operation 408, which can include processing a request to identify one or more assistant queries from the user. The one or more assistant queries can be embodied in the spoken utterance from the user to the host automated assistant. However, the host automated assistant can communicate a request characterizing the one or more assistant queries to the guest automated assistant. In response to receiving the request, the guest automated assistant or guest device can generate response data based on the one or more assistant queries. For example, the guest automated assistant can process the queries as if the user provided those queries directly to the guest automated assistant. As a result, the guest automated assistant can generate the response data, which can characterize an output and/or other data for the host automated assistant to process in order to fulfill an input from the user to the host automated assistant.

The method 400 can proceed from the operation 410 to an operation 412, which can include causing the host automated assistant to render an output that is based on the response data. For example, the response data can characterize natural language content that can be rendered at one or more interfaces of the host device. The natural language content can be responsive to a spoken utterance provided by the user to the host automated assistant. In this way, when a user is outside of their home, the user can quickly personalize nearby automated assistants that have the capability to operate in a transient personalization mode.

Figure 5:
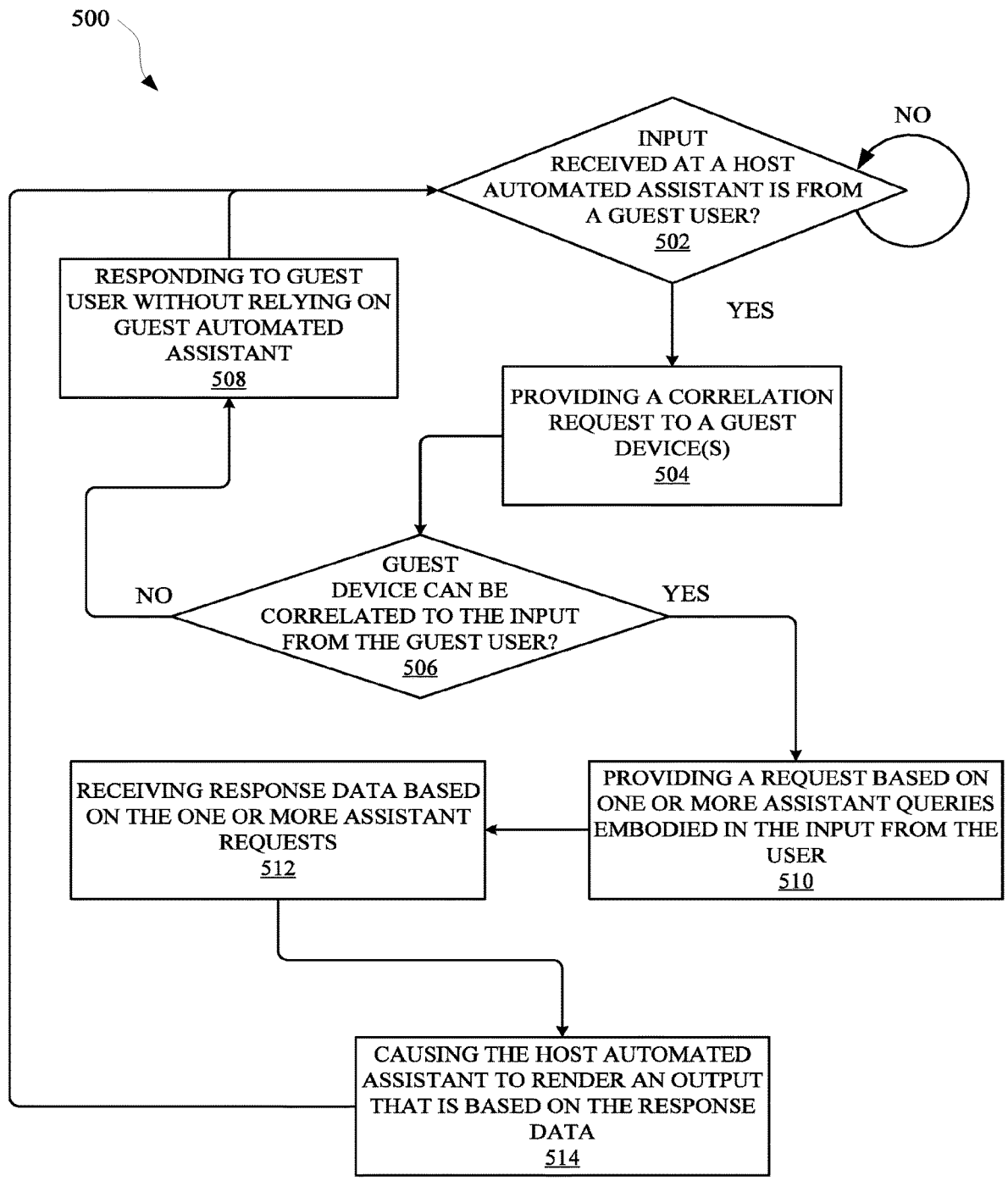
FIG. 5 illustrates a method for operating an automated assistant in a transient personalization mode when one or more guest users are interacting with the automated assistant.

FIG. 5 illustrates a method 500 for operating an automated assistant in a transient personalization mode when one or more guest users are interacting with the automated assistant. The method 500 can be performed by one or more applications, devices, and/or any other apparatus or module capable of providing access to an automated assistant. The method 500 can include an operation 502 of determining whether an input from a guest user has been received at a host automated assistant. The guest user can be someone that is not signed into the host automated assistant and/or does currently have permission to access an account of an owner of a host automated assistant device that is providing access to the host automated assistant. When an input is determined to have been received from the guest user, the method 500 can proceed from the operation 502 to an operation 504.

Otherwise, the host automated assistant can continue to determine whether a guest user has provided an input.

The operation 504 can include providing a correlation request to a guest device that is operating within a vicinity of the host device. The correlation request can be a request for a nearby device to indicate that the device is associated with the guest user who provided the input to the host automated assistant. The method 500 can proceed from the operation 504 to an operation 506, which can include determining whether the guest device can be correlated to the input from the guest user. In some implementations, the guest device can be correlated to the input when the guest device is able to decrypt an authentication value that has been encrypted using information from the input from the guest user. For example, the authentication value can be encrypted using a face embedding, a voice embedding, an image embedding, a video embedding, and/or any other signature of the guest user. Therefore, when a guest device is able to use a similar embedding to decrypt the authentication value and communicate the authentication value back to the house device, the method 500 can proceed to the operation 510. Otherwise, the method 500 can proceed to an operation 508, which can include responding to the guest user without relying on a guest automated assistant.

The operation 510 can include providing a request that is based on one or more assistant queries embodied in the input from the user. For example, in some implementations, the host automated assistant can communicate input data to a guest automated assistant in order that the guest automated assistant can generate response data based on the input data. Alternatively, or additionally, the host automated assistant can communicate a request to the guest automated assistant in order to obtain user preferences from the guest automated assistant for responding to the one or more assist queries. In some implementations, user preferences can include, but are not limited to, a speech profile or accent that the host automated assistant should employ when rendering responses to the guest user, in order that the guest user can more readily interpret outputs from the host automated assistant.

The method 500 can proceed from the operation 510 to an operation 512, which can include processing response data that is based on the one or more assistant queries. For example, in some implementations, the response data can embody audio data, textual data, natural language processing (NLP) data such as action intents and/or parameters, and/or any other data that can be used as a basis for generating an automated assistant response. The method 500 can proceed from the operation 512 to an operation 514, which can include causing the host automated assistant to render an output that is based on the response data. For example, when the host automated assistant receives the NLP data, the host automated assistant can execute one or more actions identified by the NLP data using any parameters that are also identified in the NLP data.

Figure 6:
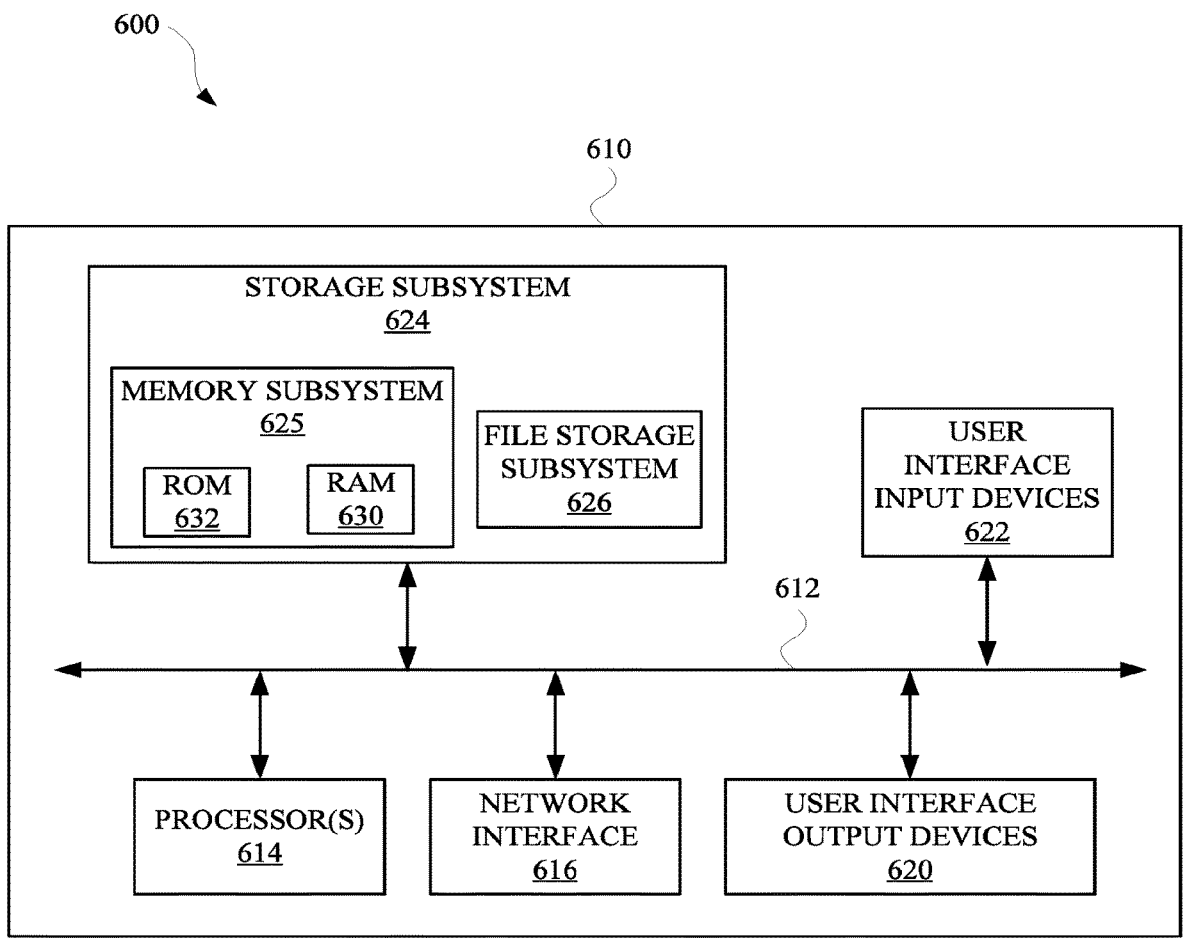
FIG. 6 is a block diagram of an example computer system.

FIG. 6 is a block diagram 600 of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, method 500, and/or to implement one or more of host device 108, personal device 110, host television 106, host device 208, personal device 210, host television 206, system 300, and/or any other application, device, apparatus, and/or module discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, at a first computing device, a request for the first computing device to process a spoken utterance that was submitted by a user to a second computing device, wherein each of the first computing device and the second computing device are located in a common environment and provide access to a respective automated assistant, and wherein the second computing device encrypts the request using signature data that is generated by the second computing device using a biometric signature that corresponds to the user. The operations can further include processing, by the first computing device, the request from the second computing device to identify one or more assistant requests embodied in the request. The operations can further include generating, by the first computing device, assistant response data characterizing one or more automated assistant responses that are responsive to the one or more assistant requests. The operations can further include causing, by the first computing device, the second computing device to render the one or more automated assistant responses for the user using the assistant response data.

In some implementations, processing the request from the second computing device includes: accessing, by the first computing device, other signature data that is associated with the user, and identifying, using the other signature data, an authentication value that is embodied in the request, or other data, from the second computing device. In some implementations, causing the second computing device to render the one or more automated assistant responses include: providing the authentication value from the first computing device to the second computing device, wherein the authentication value is generated, by the second computing device, in response to the second computing device receiving the spoken utterance from the user. In some implementations, generating the assistant response data includes: accessing, by the first computing device, stored content that is not stored at the second computing device when the second computing device receives the spoken utterance from the user.

In some implementations, generating the assistant response data includes: accessing content that is associated with an account of the user, wherein the second computing device is not authenticated to directly access the account of the user. In some implementations, causing the second computing device to render the one or more automated assistant responses includes: transmitting the assistant response data from the first computing device to the second computing device via a local area network, a Bluetooth connection, or a wide area network, wherein transmitting the assistant response data causes the second computing device to render to one or more automated assistant responses. In some implementations, the method can further include an operation of providing, at an interface of the first computing device and in response to receiving the request from the second computing device, a prompt that allows the user to select whether or not to permit the first computing device to respond to the request or subsequent requests from the second computing device. In some implementations, the method can further include an operation of providing, at an interface of the first computing device and in response to receiving the request from the second computing device, a prompt that allows the user to limit when the first computing device is permitted to respond to the request or subsequent requests from the second computing device.

In other implementations, a method implemented by one or more processors is set forth as including operations such as receiving a spoken utterance from a user that is associated with a first computing device, wherein the spoken utterance is received at a second computing device that is in a common environment with the first computing device and the user, and wherein each of the first computing device and the second computing device provide access to a respective automated assistant. The operations can further include providing, by the second computing device to the first computing device, a first request for the first computing device to confirm that the user is authenticated with the first computing device, wherein the first request embodies an authentication value that is accessible to one or more devices that are authenticated with the user. The operations can further include receiving, by the second computing device, the authentication value that indicates to the second computing device that the first computing device is capable of accessing the authentication value. The operations can further include providing, by the second computing device and based on the authentication value, a second request for the first computing device to respond to one or more assistant requests embodied in the spoken utterance. The operations can further include receiving, by the second computing device and responsive to providing the second request, assistant response data that is responsive to the one or more assistant requests embodied in the spoken utterance. The operations can further include causing, by the second computing device, one or more interfaces of the second computing device to render an automated assistant output that is based on the assistant response data.

In some implementations, the operations can further include identifying, by the second computing device, an authentic signature of the user; and generating, by the second computing device, the first request by encrypting the authentication value using the authentic signature. In some implementations, the operations can further include processing, by the second computing device, the assistant response data using the authentic signature, wherein the assistant response data is encrypted by the first computing device using the authentic signature. In some implementations, the authentic signature of the user corresponding to an audio-based signature or an image-based signature. In some implementations, the operations can further include determining, in response to receiving the spoken utterance, that the spoken utterance embodies one or more requests to access content that the second computing device is not currently permitted to access. In some implementations, providing the second request for the first computing device to respond to one or more assistant requests includes: providing, to the first computing device, audio data or textual data characterizing one or more portions of the spoken utterance provided by the user to the second computing device. In some implementations, providing the second request for the first computing device to respond to one or more assistant requests includes: providing, to the first computing device, action data characterizing one or more automated assistant actions to be performed by the automated assistant in response to the user providing the spoken utterance to the second computing device.

In yet other implementations a method implemented by one or more processors is set forth as including operations such as receiving a spoken utterance from a user that is associated with a first computing device, wherein the spoken utterance is received at a second computing device that is in a common environment with the first computing device and the user, and wherein each of the first computing device and the second computing device provide access to a respective automated assistant. The operations can further include providing, by the second computing device to the first computing device, a first request for the first computing device to confirm that the user is authenticated with the first computing device, wherein the first request embodies an authentication value that is accessible to one or more devices that are authenticated with the user. The operations can further include, when the first computing device is able to access the authentication value: receiving, by the second computing device, authentication data that indicates to the second computing device that the first computing device is able to access the authentication value. The operations can further include providing, by the second computing device and based on the first computing device being able to access the authentication value, a second request for the first computing device to provide user preference data for responding to one or more assistant requests embodied in the spoken utterance. The operations can further include receiving, by the second computing device and responsive to providing the second request, the user preference data that identifies one or more user preferences to be adopted by an automated assistant of the second computing device when responding to the one or more assistant requests submitted by the user. The operations can further include causing, by the second computing device, one or more interfaces of the second computing device to render an automated assistant output that is based on the user preference data.

In some implementations, the method can further include an operation of generating, based on the user preference data, automated assistant output data that the automated assistant output is further based upon, wherein the user preference data identifies one or more automatic speech recognition models to use when processing the spoken utterance from the user. In some implementations, the operations can further include generating, based on the user preference data, automated assistant output data that the automated assistant output is further based upon, wherein the user preference data identifies one or more text to speech models to use when rendering the automated assistant output for the user. The operations can further include generating, based on the user preference data, automated assistant output data is responsive to the one or more assistant requests, wherein the user preference data identifies content rankings for candidate content identified by the second computing device when generating the automated assistant output data. The operations can further include, when the first computing device is unable to access the authentication value: causing, by the second computing device, the one or more interfaces of the second computing device to render a different automated assistant output that is not based on the user preference data.

What is claimed is:

1. A method implemented by one or more processors, the method comprising:
    receiving a spoken utterance from a user that is associated with a first computing device,
        wherein the spoken utterance is received at a second computing device that is in a common environment with the first computing device and the user,
        wherein each of the first computing device and the second computing device provide access to a respective automated assistant, and
        wherein each of the first computing device and the second computing device are client computing devices;
    providing, by the second computing device to the first computing device in the common environment, a first request for the first computing device to confirm that the user is authenticated with the first computing device,
        wherein the first request embodies an authentication value that is accessible to one or more devices that are authenticated with the user;
    receiving, by the second computing device, the authentication value that indicates to the second computing device that the first computing device is capable of accessing the authentication value;
    providing, by the second computing device and based on the authentication value, a second request for the first computing device in the common environment to respond to one or more assistant requests embodied in the spoken utterance;
    receiving, by the second computing device and responsive to providing the second request, assistant response data that is responsive to the one or more assistant requests embodied in the spoken utterance; and
    causing, by the second computing device, one or more interfaces of the second computing device to render an automated assistant output that is based on the assistant response data.

2. The method of claim 1, further comprising:
    identifying, by the second computing device, an authentic signature of the user; and generating, by the second computing device, the first request by encrypting the authentication value using the authentic signature.

3. The method of claim 2, further comprising:
processing, by the second computing device, the assistant response data using the authentic signature,
wherein the assistant response data is encrypted by the first computing device using the authentic signature.

4. The method of claim 2, wherein the authentic signature of the user corresponding to an audio-based signature or an image-based signature.

5. The method of claim 1, further comprising:
determining, in response to receiving the spoken utterance, that the spoken utterance embodies one or more requests to access content that the second computing device is not currently permitted to access.

6. The method of claim 1, wherein providing the second request for the first computing device to respond to one or more assistant requests includes:
providing, by the second computing device and to the first computing device, audio data or textual data characterizing one or more portions of the spoken utterance provided by the user to the second computing device.

7. The method of claim 1, wherein providing the second request for the first computing device to respond to one or more assistant requests includes:
providing, by the second computing device and to the first computing device, action data characterizing one or more automated assistant actions to be performed by the automated assistant in response to the user providing the spoken utterance to the second computing device.

8. A method implemented by one or more processors, the method comprising:
receiving a spoken utterance from a user that is associated with a first computing device,
wherein the spoken utterance is received at a second computing device that is in a common environment with the first computing device and the user,
wherein each of the first computing device and the second computing device provide access to a respective automated assistant, and
wherein each of the first computing device and the second computing device are client computing devices;
providing, by the second computing device to the first computing device in the common environment, a first request for the first computing device to confirm that the user is authenticated with the first computing device,
wherein the first request embodies an authentication value that is accessible to one or more devices that are authenticated with the user;
when the first computing device is able to access the authentication value:
receiving, by the second computing device and from the first computing device authentication data that indicates to the second computing device that the first computing device is able to access the authentication value;
providing, by the second computing device and to the first computing device, and based on the first computing device being able to access the authentication value, a second request for the first computing device in the common environment to provide user preference data for responding to one or more assistant requests embodied in the spoken utterance;
receiving, by the second computing device and from the first computing device, and responsive to providing the second request, the user preference data that identifies one or more user preferences to be adopted by an automated assistant of the second computing device when responding to the one or more assistant requests submitted by the user; and
causing, by the second computing device, one or more interfaces of the second computing device to render an automated assistant output that is based on the user preference data.

9. The method of claim 8, further comprising:
generating, based on the user preference data, automated assistant output data that the automated assistant output is further based upon,
wherein the user preference data identifies one or more automatic speech recognition models to use when processing the spoken utterance from the user.

10. The method of claim 8, further comprising:
generating, based on the user preference data, automated assistant output data that the automated assistant output is further based upon,
wherein the user preference data identifies one or more text to speech models to use when rendering the automated assistant output for the user.

11. The method of claim 8, further comprising:
generating, based on the user preference data, automated assistant output data that is responsive to the one or more assistant requests,
wherein the user preference data identifies content rankings for candidate content identified by the second computing device when generating the automated assistant output data.

12. The method of claim 8, further comprising:
when the first computing device is unable to access the authentication value:
causing, by the second computing device, the one or more interfaces of the second computing device to render a different automated assistant output that is not based on the user preference data.

13. A system, comprising:
one or more computers; and
one or more storage devices storing instructions that are operable and, when executed by the one or more computers, cause the one or more computers to perform operations, the operations comprising:
receiving a spoken utterance from a user that is associated with a first computing device,
wherein the spoken utterance is received at a second computing device that is in a common environment with the first computing device and the user,
wherein each of the first computing device and the second computing device provide access to a respective automated assistant, and
wherein each of the first computing device and the second computing device are client computing devices;
providing, by the second computing device to the first computing device in the common environment, a first request for the first computing device to confirm that the user is authenticated with the first computing device,
wherein the first request embodies an authentication value that is accessible to one or more devices that are authenticated with the user;
receiving, by the second computing device, the authentication value that indicates to the second computing device that the first computing device is capable of accessing the authentication value;

providing, by the second computing device and based on the authentication value, a second request for the first computing device in the common environment to respond to one or more assistant requests embodied in the spoken utterance;

receiving, by the second computing device and responsive to providing the second request, assistant response data that is responsive to the one or more assistant requests embodied in the spoken utterance; and causing, by the second computing device, one or more interfaces of the second computing device to render an automated assistant output that is based on the assistant response data.

14. The system of claim 13, further comprising:

identifying, by the second computing device, an authentic signature of the user; and generating, by the second computing device, the first request by encrypting the authentication value using the authentic signature.

15. The system of claim 14, further comprising:

processing, by the second computing device, the assistant response data using the authentic signature,
wherein the assistant response data is encrypted by the first computing device using the authentic signature.

16. The system of claim 14, wherein the authentic signature of the user corresponding to an audio-based signature or an image-based signature.

17. The system of claim 13, further comprising:

determining, in response to receiving the spoken utterance, that the spoken utterance embodies one or more requests to access content that the second computing device is not currently permitted to access.

18. The system of claim 13, wherein providing the second request for the first computing device to respond to one or more assistant requests includes:

providing, by the second computing device and to the first computing device, audio data or textual data characterizing one or more portions of the spoken utterance provided by the user to the second computing device.

19. The system of claim 13, wherein providing the second request for the first computing device to respond to one or more assistant requests includes:

providing, by the second computing device and to the first computing device, action data characterizing one or more automated assistant actions to be performed by the automated assistant in response to the user providing the spoken utterance to the second computing device.

* * * * *